United States Patent [19]

Tayebi

[11] Patent Number: 4,677,812
[45] Date of Patent: Jul. 7, 1987

[54] METHOD FOR SEALING TAMPER-EVIDENT CAPSULES

[75] Inventor: Amad Tayebi, Westford, Mass.

[73] Assignee: Capsule Technology International, Ltd., Windsor, Canada

[21] Appl. No.: 897,381

[22] Filed: Aug. 18, 1986

Related U.S. Application Data

[63] Continuation of Ser. No. 614,746, May 29, 1984, which is a continuation-in-part of Ser. No. 529,162, Sep. 2, 1983, abandoned.

[51] Int. Cl.⁴ ............................................. B65B 51/10
[52] U.S. Cl. ...................................... 53/477; 53/478; 53/900; 156/69; 156/294
[58] Field of Search ...................... 53/266 R, 331, 333, 53/334, 366, 454, 477, 478, 486, 488, 489, 131, 287, 900, 290, 373; 156/69, 294, 499, 583.1

[56] References Cited

U.S. PATENT DOCUMENTS

| | | | |
|---|---|---|---|
| 2,738,827 | 3/1956 | Roll | 53/131 |
| 2,748,005 | 5/1956 | Baier | 53/486 X |
| 3,538,677 | 11/1970 | Amoroso | 53/900 X |
| 3,723,212 | 3/1973 | Casper | 156/69 |
| 3,838,550 | 10/1974 | Mueller | 156/583.1 X |
| 4,478,658 | 10/1984 | Wittwer | 156/69 |
| 4,522,666 | 6/1985 | Wittwer | 156/294 X |
| 4,584,817 | 4/1986 | Yamamoto et al. | 53/900 X |
| 4,606,784 | 8/1986 | Glans et al. | 156/499 X |

Primary Examiner—Robert L. Spruill
Assistant Examiner—Steven P. Weihrouch
Attorney, Agent, or Firm—Joseph E. Funk

[57] ABSTRACT

A method for sealing an assembled gelatine capsule of the type used to contain and dispense medication is disclosed. An assembled capsule the axis of which is oriented perpendicular to the axis of a thin elongated bar is moved along and in contact with a thin edge of the elongated bar. The surface of the assembled capsule, at a point where the cap and body of the capsule overlie each other, is initially in contact with the thin edge of one end of the bar and the capsule is moved along the length of said bar so that the axis of the capsule moves closer to the edge of the bar. The bar is heated so as to be at a first temperature at a first point between its ends that will melt the gelatine, and the remainder of the bar is at a temperature that will heat plasticize the gelatine. As the capsule is moved along the heated bar it is rotated either by friction between the bar and the capsule or by mechanical means. The result is that a circumferential indentation is created around the capsule where the cap and body overlie each other, and the cap and body are fused to each other creating a hermetic seal. When a hermetric seal is not desired the temperature at the first point is below the melting temperature of the gelatine. The formed indentation and the hermetic seal, singly and combinationally, cooperate such that any attempt to separate the cap and body of a sealed capsule will fracture the cap and/or body and thereby provide an indication that the sealed capsule has been tampered with.

10 Claims, 26 Drawing Figures

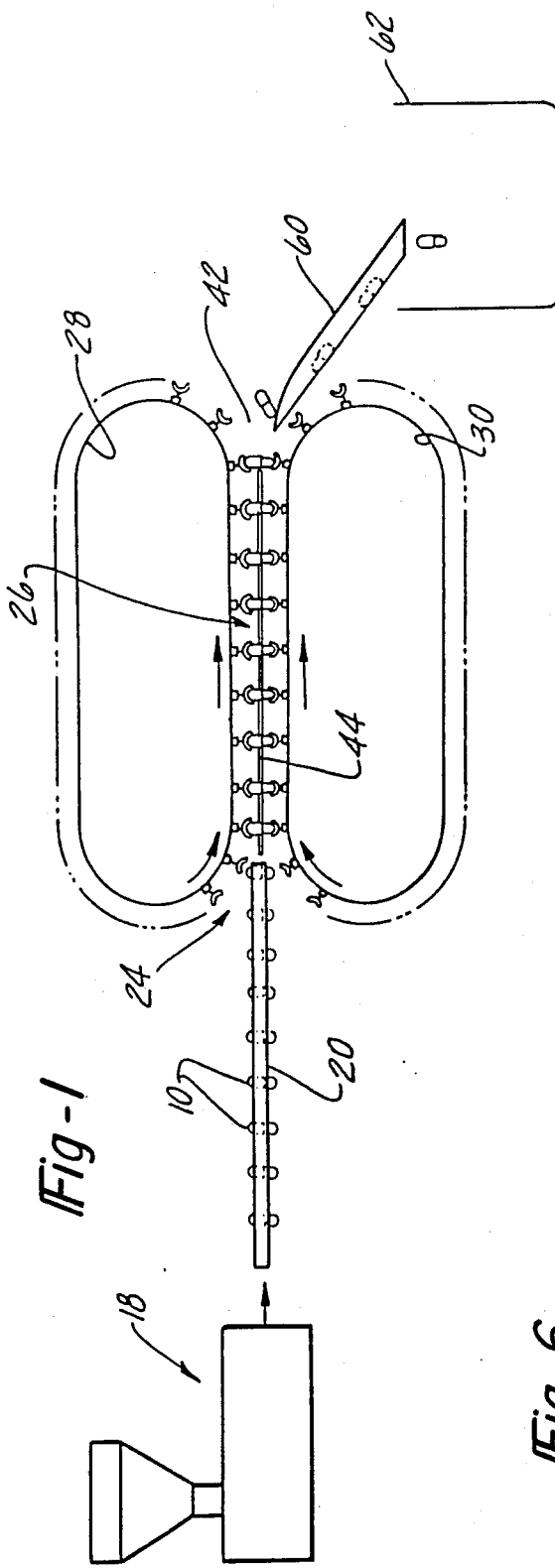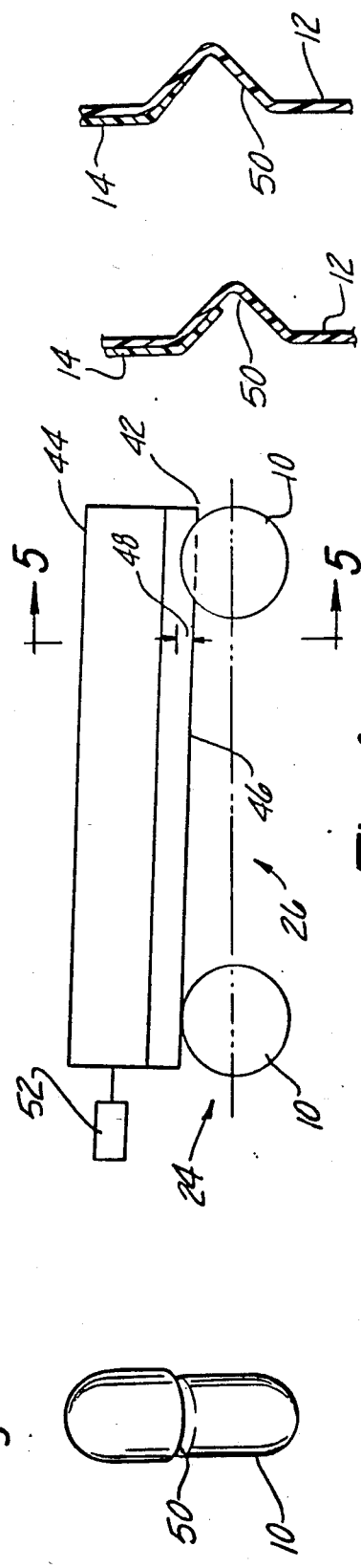

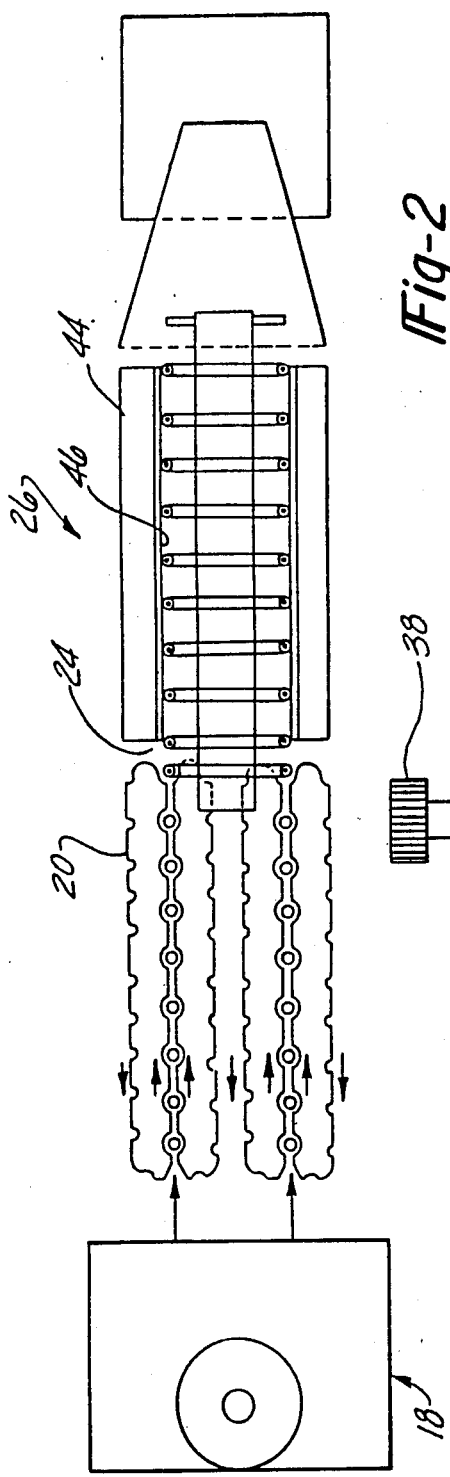
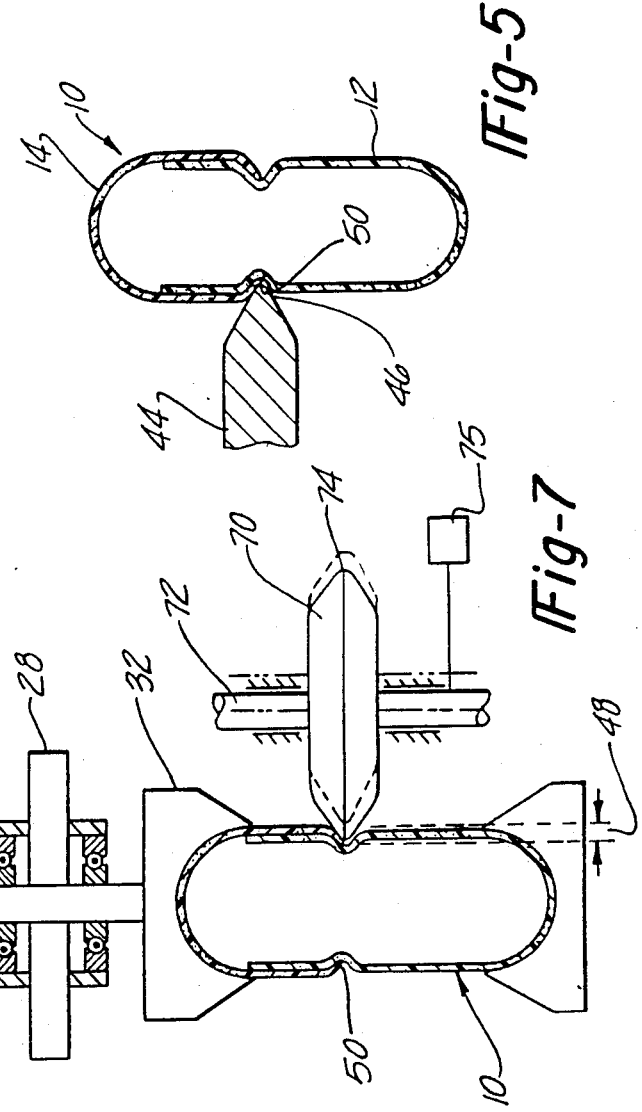
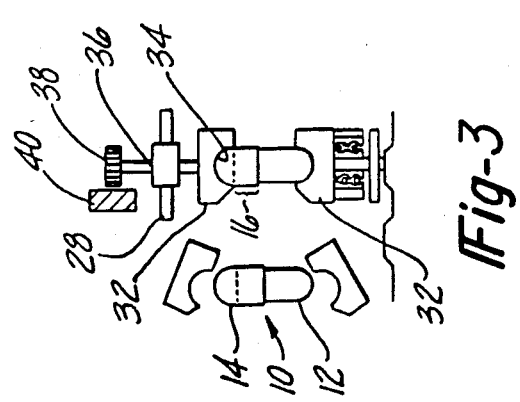

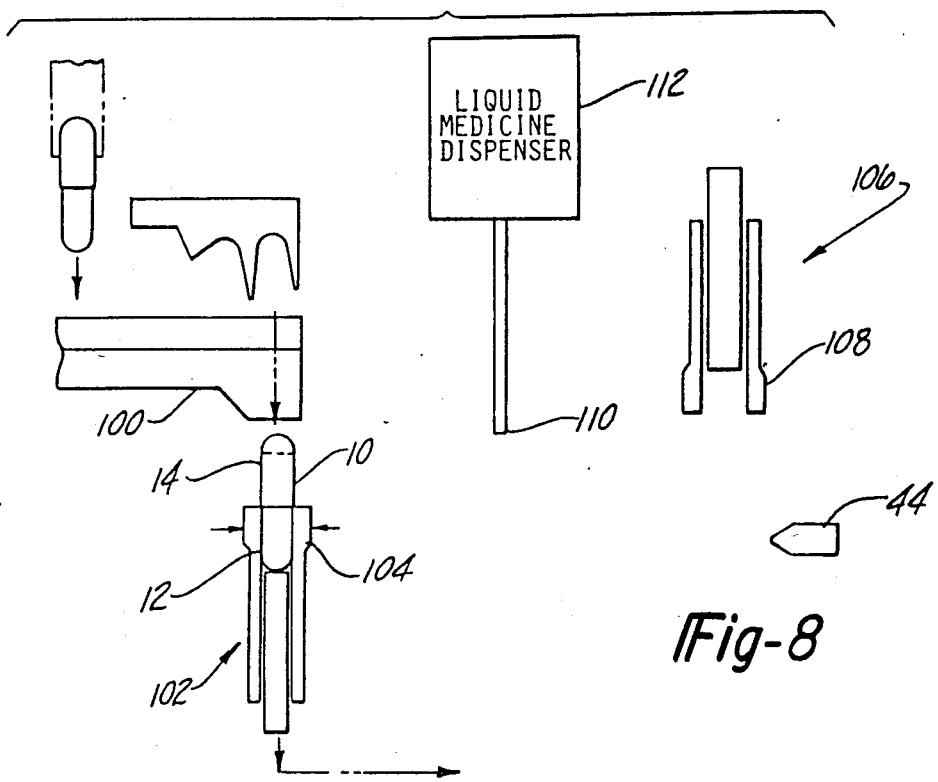
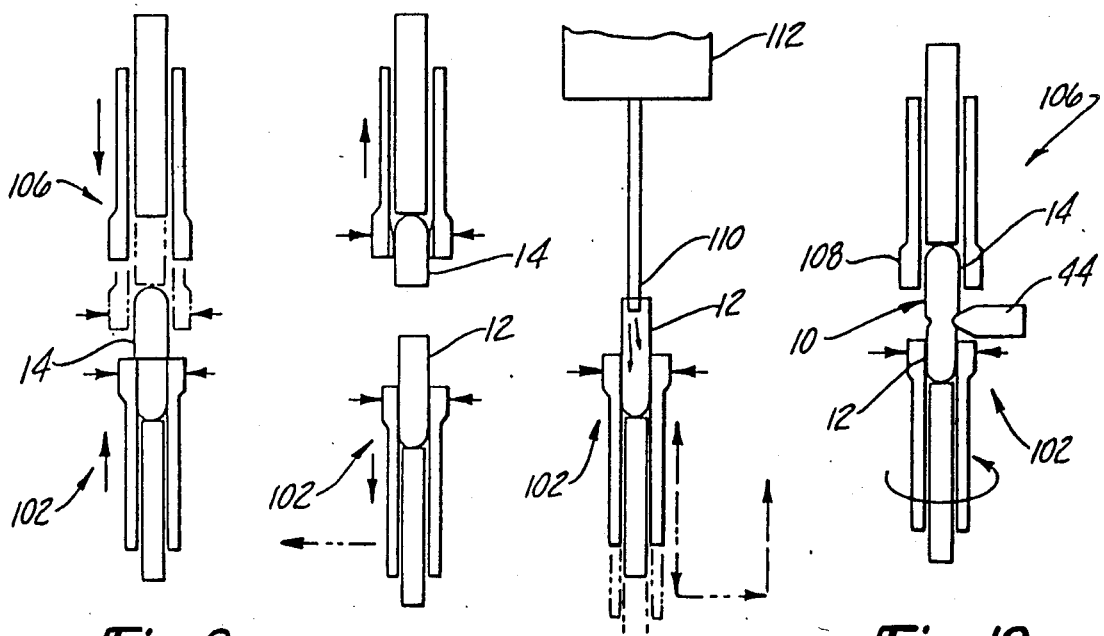
Fig-8
Fig-9   Fig-10   Fig-11   Fig-12

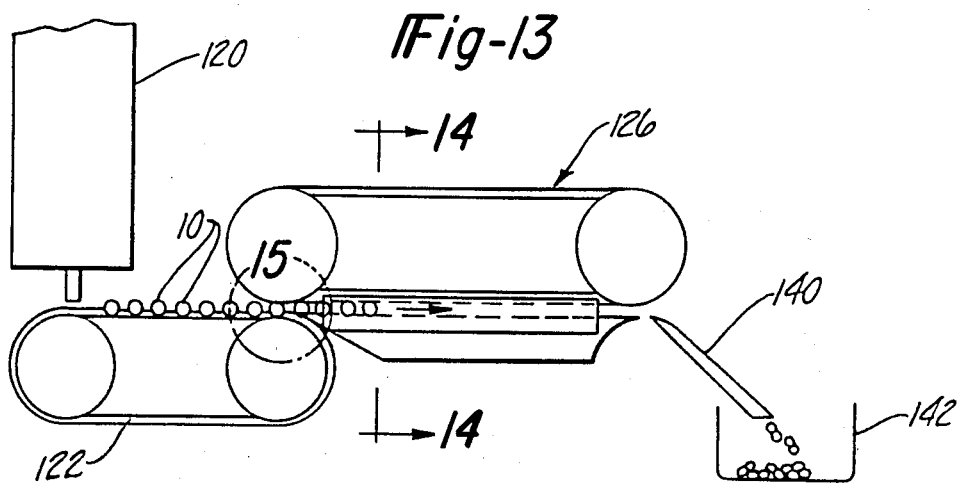
Fig-13
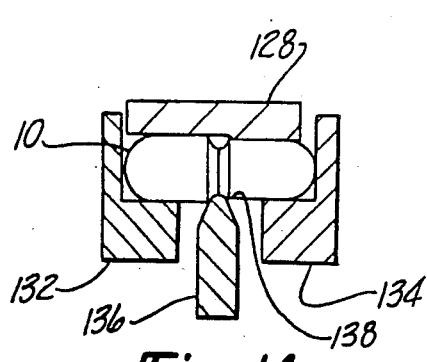
Fig-14
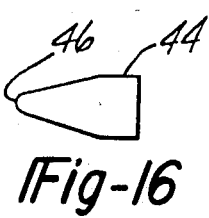
Fig-16
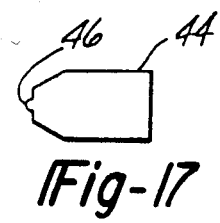
Fig-17
Fig-18
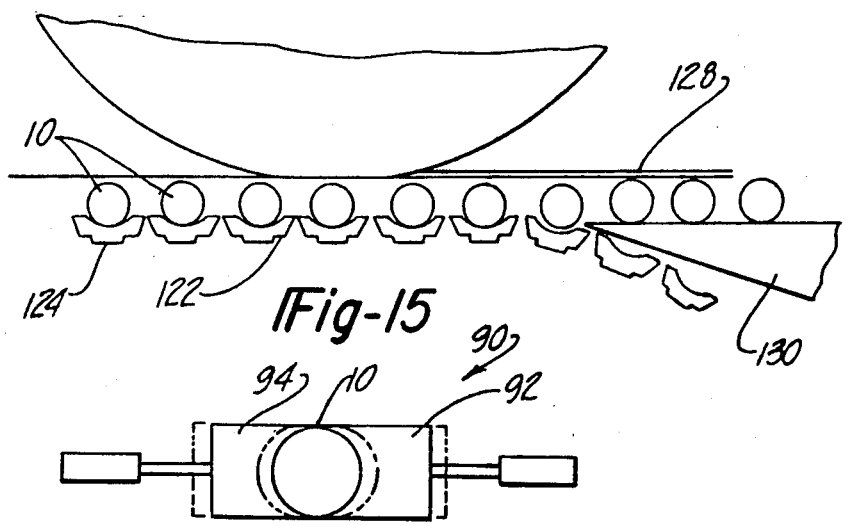
Fig-15
Fig-19

METHOD FOR SEALING TAMPER-EVIDENT CAPSULES

CROSS REFERENCE TO RELATED APPLICATION

"This is a continuation of copending patent application Ser. No. 614,746 filed on May 29, 1984; which in turn was a continuation-in-part of a then copending patent application Ser. No. 529,162 filed on Sept. 2, 1983 now abandoned."

BACKGROUND OF THE INVENTION

I. Field of the Invention

The present invention provides a device for fixedly securing the body and cap of a conventional hard gelatin capsule together in a tamper evident form. The invention also provides a device for filling empty conventional hard gelation capsules with liquid or paste medicines and hermetically sealing the cap to the body in a tamper evident form.

II. Description of the Prior Art

Many types of medicines are distributed in capsule form. These capsules are conventional in construction and include an elongated tubular cap as well as an elongated and tubular body. The cap fits over the body so that a portion of the cap overlies a portion of the body. The cap and body when joined form a closed chamber therebetween in which a medicine is contained.

These previously known capsules, however, have not proven wholly satisfactory in use. One disadvantage of these previously known capsules is that the cap and body can be easily separated from each other and allow the introduction of contaminants or foreign substances into the capsule chamber. In certain instances, the introduction of contaminants into the capsule chamber has been intentional.

There have been a number of previously known methods, such as ultrasonic welding, adhesives and gelatin bands for sealing the cap and body together. These previously known methods, however, are uneconomical and the use of adhesives is further disadvantageous in that adhesives are difficult to digest.

A still further disadvantage of these previously known capsules is that the capsule is only capable of containing solid, rather than liquid or paste, medicine. If liquid medicine is introduced into the capsule chamber of these previously known capsules, the liquid quickly leaks from the capsule chamber and past the junction of the capsule cap and body.

Soft gelation capsules, however, have been used to contain liquid or paste medicines. These soft gelatin capsules are disadvantageously expensive to manufacture and utilize a relatively thicker shell which results in slower dissolution. Furthermore, the equipment necessary to fill soft gelation capsules with liquid is expensive and bulky in construction.

SUMMARY OF THE PRESENT INVENTION

The present invention provides a device for securing and/or sealing the cap and body of the capsule together which overcomes all of the above-mentioned disadvantages. The present invention thus renders conventional hard gelation capsules tamper evident.

In brief, the present invention comprises a conveyor which transports the capsules at spaced intervals along a predetermined path of travel and so that the axis of each capsule is perpendicular to the path of travel. The path of travel extends through a treatment zone having both an entry and exit end.

In one form of the invention, an elongated bar having a tapered edge is positioned within the treatment zone so that the bar is substantially parallel to the path of travel. In addition, the bar is positioned so that its tapered edge frictionally engages the portion of the capsule in which the cap overlies the body along the passage of the capsule through the treatment zone. Preferably, the bar is angled towards the capsules from the entry and to the exit end of the treatment zone so that the interference between the tapered edge of the bar and the capsules increases from the entry into the exit end of the treatment zone. The actual shape of the tapered edge can take any of several forms, such as round, square, trapezoidal and the like.

As the capsule is transported through the treatment zone, a further conveyor rotates the capsule and the tapered edge of the bar forms an indentation in the side of the capsule where the cap overlaps the body thus locking and hermetically sealing the cap and body together. Preferably, the depth of the indentation is sufficient to cause the capsule to break apart upon an attempt to separate the cap from the body even when no sealing is effected between the cap and body. The rate of relative rotation between the capsule and the bar can be varied by controlling the speed of the further conveyor.

Alternatively, the frictional engagement between the bar and capsule rotates the capsule so that this indentation is formed circumferentially around the entire capsule.

Alternatively, the capsule is rotatedly driven about its axis during its passage through the treatment zone. The rate of slippage, if any, between the capsule and the bar can also be varied by controlling the rate of rotation of the capsule relative to its location on the bar. This may be achieved by a gear arrangement.

In the preferred form of the invention, the bar is heated so that the bar temperature increases progressively from the entry to an intermediate point and then progressively decreases from the intermediate point and the exit end of the treatment zone. Consequently, in addition to forming the indentation between the cap and body of the capsule, the heat from the bar melts the capsule material, typically gelatin, thus forming a fluid or hermetic seal between the capsule cap and body. In practice, this fluid seal is sufficient to enable liquid medicine to be contained within the capsule chamber.

In an alternative form of the invention, the bar is replaced by a disc wherein the disc includes an outer tapered edge. The disc is rotatably mounted and aligned with the capsule in the treatment zone. Means move the disc toward the capsule so that the outer tapered edge of the disc engages the side of the capsule and form an indentation of increasing depth as the distance between the disc axis and the capsule axis is decreased by the moving means. In addition, the disc, like the bar, can be heated to produce a fluid seal between the capsule cap and body.

In yet another form of the invention the capsule is held, preferably in a collet, (positively gripped or vacuum or friction held) and rotated around a stationary, preferably vertical, axis while the bar is moved laterally towards the capsule in order to produce the desired indentation. Alternatively, the bar may be moved in a direction substantially perpendicular to the capsule axis while, simultaneously or sequentially, the distance between the bar edge and the capsule is decreased in order to effect contact between the capsule and the bar, thus causing capsule indentation. In this case, the capsule may be freely rotated by the frictional contact with the bar, held stationary or positively driven to rotate against or with the bar lateral movement.

Altrnatively, an embosser can be used to form the indentation and/or sealing of the capsule. Such embosser is preferably heated and comprises multiple and simultaneously acting components. Similarly, multiple indentations can be formed on the capsule. When multiple embossed indentations are formed, it is preferred that the capsule is rotated by a predetermined amount, e.g. 90°, between successive embossed indentations in order to achieve a fluid (hermetic) seal between the cap and body. The longitudinal and lateral cross sections or the capsule can be of any desired shape.

The indentation may also be discontinuous and/or of a non-circular shape. For example, a corrugated indentation may be obtained by the use of similarly corrugated bar, disc or embosser edge. This is particularly desirable for prevention of cap and body relative rotation, without capsule breaking, even when no sealing is effected.

In invention capsule is tamper evident in that the indentation is of a depth sufficient to casue failure of the cap and/or body upon attempting to unjoin or part the treated filled capsule. Alternatively, when the indentation is achieved with a thermal fusion sealing between the cap and body, the invention capsule is tamper evident regardless of the depth of indentation. In this case, the capsule will break apart upon attempting to unjoin its cap and body. Thus, it is possible to obtain tamper evident filled capsules even with extremely shallow indentations when a fusion seal is effected between the cap and body.

The indentation on the invention capsule may be located anywhere in the area of cap and body overlap. It is preferred, however, to locate the indentation such that the treated capsule cap throat (opening) diameter is smaller than the body throat diameter.

The sealing bond, being adhesive-free, is of a cohesive nature in that it results from the melting of its components and their co-solidification.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a side view illustrating a preferred embodiment of the present invention;

FIG. 2 is a top view illustrating the preferred embodiment of the invention;

FIG. 3 is a fragmentary view illustrating a portion of the present invention;

FIG. 4 is a schematic view illustrating a portion of the preferred embodiment of the invention;

FIG. 5 is a view taken substantially along line 5—5 in FIG. 4;

FIG. 6 is a perspective view illustrating a capsule treated according to the present invention;

FIGS. 6a and 6b are fragmentary cross-sectional views illustrating a portion of the capsule without and with cap and body sealing respectively;

FIG. 7 is a view similar to FIG. 5 but illustrating a further preferred embodiment of the invention;

FIGS. 8-12 are schematic views showing a preferred embodiment for sealing a liquid or paste medicine in a capsule;

FIG. 13 is a side view showing a further preferred embodiment of the invention;

FIG. 14 is a sectional view taken along line 14—14 in FIG. 13;

FIG. 15 is an enlarged view of circle 15 in FIG. 13;

FIGS. 16-18 are side views showing alternative forms of the indentation forming bar or disc;

FIG. 19 is a top view showing yet another preferred form of the invention;

DETAILED DESCRIPTION OF PREFERRED EMBODIMENTS OF THE PRESENT INVENTION

Figure 20:
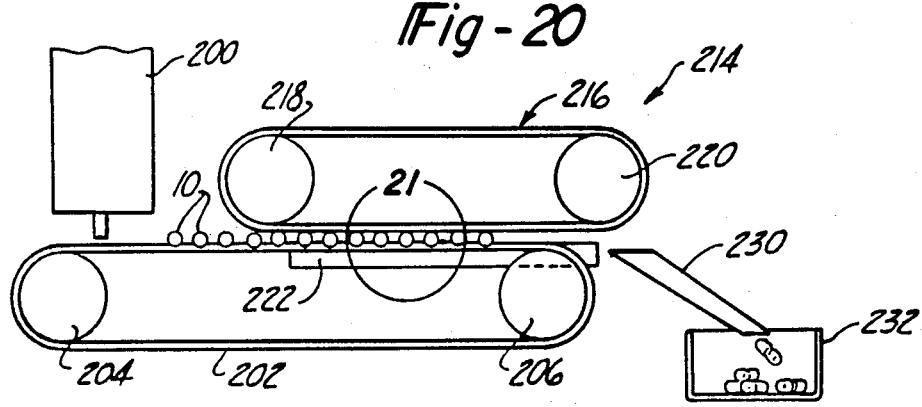
FIG. 20 is a side view showing a further preferred embodiment of the invention.

With reference first to FIGS. 1-3, a preferred embodiment of the capsule treating device of the present invention is there shown. The capsules 10 (FIG. 3) are conventional in construction and comprises a tubular and cylindrical body 12 and a tubular and cylindrical cap 14. The cap 14 slidably fits over the body 12 so that a portion 16 of the cap overlies a like portion of the body 12. The cap 14 and body 12 form an interior capsule chamber in which a medicine is contained. Typically, the body 12 and cap 14 are constructed of gelatin and, previously, have only been frictionally secured together.

Still referring to FIGS. 1-3, the capsules 10 are fed into a hopper 18 of conventional construction. The hopper 18 feeds the capsules to at least one and preferably two conveyor belts 20 which transport the capsules 10 from the hopper 18 and to the entry 24 of a treatment zone 26. The conveyor belts 20 deliver the capsules 10 to the entry 24 of the treatment zone 26 of predetermined spaced intervals and so that the longitudinal axes of the capsules 10 are perpendicular to the direction of travel of the conveyor belts 20.

With reference now particularly to FIGS. 1 and 3, at the treatment zone 26, an upper conveyor belt 28 is positioned above the capsules 10 and rotatably driven in a counterclockwise direction. Similarly, a lower conveyor belt 30 is positioned beneath the capsules 10 and is driven in a clockwise direction. A plurality of capsule engaging members 32 are secured to and extend outwardly from each conveyor belt 28 and 30 at spaced intervals which conform to the spacing of the capsules 10 along the first conveyor belt 20.

As best shown in FIG. 3, each capsule engaging member 32 includes a semi-spherical recess 34 which engages one end of the capsule 10. The conveyors 28 and 30, together with the capsule engaging members 32 thus transport the capsules 10 through the treatment zone 26 so that the longitudinal axis of the capsules 10 is perpendicular to the direction of travel of the capsules 10 through the treatment zone 26 so that the overlapped portion 16 of the capsule cap 14 and body 12 are exposed. In addition, in the preferred form of the invention, the capsule engaging members 32 are secured to the shaft 36 which is rotatably mounted to the conveyor belts 28 and 30. A pinion 38 is attached to the shaft 36 and meshes with a stationary gear rack 40 so that the capsules 10 are rotatably driven about their longitudihal axis during their travel from the entry end 24 and to the exit end 42 of the treatment zone 26.

With reference now particularly to FIGS. 1, 2, 4 and 5, an elongaged bar 44 having a tapered or pointed edge 46 is positioned within the treatment zone 26. As best shown in FIG. 1, the bar 44 lies in a plane generally parallel to the direction of travel of the capsules 10 and so that the tapered edge 46 of the bar 44 intersects the overlapped portion 16 of the capsules 10. The bar 44 extends substantially along the entire length of the treatment zone 26.

With reference now particularly to FIG. 4, the bar 44 is angled towards the capsules 10 from the entry end 24 and to the exit end 42 of the treatment zone. Thus, at the entry end 24 of the treatment zone 26, the tapered edge 46 of the bar 44 just engages the outer periphery of the capsule 10. Conversely, the interference between the bar edge 46 and the capsule 10 increases until the interference between the bar 44 and capsule 10 achieves a predetermined depth 48 (FIG. 7) at the exit end 42 of the treatment zone 26.

As best shown in FIG. 5, the edge 46 of the bar 44 forms an indentation 50 in both the capsule body 12 and cap 14 which increases progressively in depth from the entry end 24 and to the exit end 42 of the treatment zone 26. Since the capsules 10 are rotatably driven by the pinion 38 and gear rack 40 (FIG. 3) this indentation 50 is formed circumferentially around the entire capsule 10. Furthermore, as best shown in FIGS. 6 and 6a, this indentation 50 is of a depth sufficient to fixedly secure the capsule cap 14 and body 12 together, i.e., sufficient to prevent the separation of the capsule cap 14 and body 12 without destruction of the capsule 10 itself. Alternatively, as best shown in FIGS. 6 and 6b, the indentation 50 seals the cap and body together and is formed circumferentially around the entire capsule 10, thus achieving a fluid (hermetic) seal between the cap and body.

The pinion 38 is designed to produce any desired rate of slippage between the capsule 10 and the bar 44.

Referring gain to FIG. 4, in the preferred embodiment of the invention, heating means 52 are operatively attached to the bar 44 and heat the bar 44 along its length. Preferably, the heating means 52 progressively heats the bar 44 along its length to an intermediate point and progressively decreases its temperature from the intermediate point to the exit end 42. Consequently, the entry and exit temperatures for the capsule 10 with respect to the treatment zone are substantially the same. In practice, the bar 44, when heated by the heating means 52, not only indents the side of the capsule 10 but also partially melts and thus seals the capsule cap 14 and body 12 together as best shown in FIG. 6b. In practice, the hermetic seal provided between the capsule cap and body by the heated bar 44 is sufficient to fluidly (hermetically) seal a liquid or paste medicine within the capsule chamber.

With reference now to FIG. 1, following the sealing of the capsule cap and body within the treatment zone 26, the now sealed capsules 10 are ejected by the conveyor belts 28 and 30 through a chute 60 and to a collection bin 62.

Although the bar edge 46 is illustrated as tapered in FIG. 5, it can assume other shapes such as shown in FIGS. 16-18. Likewise, the bar edge 46 can be corrugated to produce capsule indentations having different cross sectional shapes.

With reference now to FIG. 7, a second preferred embodiment of the present invention is there shown in which the bar 44 is replaced by a disc 70 which is rotatably mounted on axle 72. The disc 70 includes an outer tapered edge 74 which engages the side of the capsule 10 to form the indentation 50. Moving means 75 move the disc 70 from the position shown in phantom line to the position shown in solid line so that the interference between the disc 70 and the capsules 10 increases as the distance between the disc axis and capsule axis is decreased. Like the bar 44, the disc 70 is preferably heated to seal the cap 14 and body 12 together.

With reference now to FIG. 19, an embosser 90 can alternatively be used to seal the capsule 10. The embosser 90 is heated and includes two parts 92 and 94 movable between an open position (phantom line) and a closed position (solid line). In its closed position, the embosser forms the indentation in the capsule 10. Similarly multiple indentations can be formed on the capsule.

Still referring to FIG. 19 and during a single embossed indentation operation, the embosser 90 fails to produce a hermetic seal at the parting line of the embosser parts 92 and 94. Consequently, in order to produce a hermetic seal, the capsule 10 is rotated, e.g. by 90 degrees, after the embossing operation and with the parts 92 and 94 in their open position so that the peripheral portions of the capsule 10 formerly at the parting line of the embosser parts 92 and 94 are instead aligned with the embossing surfaces on the embosser parts 92 and 94. The embosser parts 92 and 94 are then moved to their closed position to hermetically seal the capsule 10.

Still other means can be used to form the indentation in the capsule.

A primary advantage of the device of the present invention is that conventional hard gelatin capsules can be used to encapsulate liquid medicines. With reference then to FIG. 8, rectifier 100, which can be of any conventional construction, feeds an assembled but empty capsule 10 to a lower holder 102. The holder 102 includes a collet 104 which, when activated, mechanically grips the capsule body 12.

With reference now to FIGS. 8 and 9, once the capsule 10 has been fed to the lower holder 102, the holder 102 is moved underneath and in alignment with an upper holder 106. The upper holder 106 includes a collet 108 which, when activated, mechanically grips the cap 14 of the capsule 10. Thus, with the holders 102 and 106 in alignment with each other, the upper holder 106 is moved axially from the position shown in solid line and to the position shown in phantom line in FIG. 9. The collet 100 is then activated thus locking the collet 108 to the capsule cap 14. Subsequent axial retraction of the upper holder 106, as shown in FIG. 10, separates the cap 14 of the capsule 10 from its body 12. In doing so, the body 12 remains attached to the lower holder 102.

With reference now to FIGS. 8 and 11, the lower holder 102 is then moved transversely until the capsule body 12 is aligned with the outlet 110 of a liquid or paste medicine dispenser 112. The lower holder 102 is then moved upwardly towards the dispenser outlet 110 and to the position shown in FIG. 11 in which the outlet from the dispenser 110 is positioned just within the open end of the capsule body 12. At this time, the dispenser 112 is activated which fills the capsule body 12 with the liquid or paste medicine.

With reference now to FIG. 12, after the liquid or paste medicine fills the capsule body 12, the lower holder 102 is retracted to its lower position and transversely moved into alignment with the upper holder 106. The holders 102 and 106 are then moved axially towards each other thus reseating the capsule cap 14 onto the body 12. At this time, the collet 108 on the paper holder 106 is unlocked and the lower holder 102 is rotatably driven while the capsule 110 engages the edge 46 of a preferably heated bar 44 to form the indentation in the capsule 10. Following formation of the indentation, the capsule 10 is ejected and lower holder 102 is returned to its position shown in FIG. 8 for receipt of a subsequent capsule whereupon the above described process is repeated.

The device is shown in FIGS. 8–12 can also be used to seal a capsule containing a solid medicine. In this event, however, the steps indicated in FIGS. 9–11 are omitted.

With reference now to FIGS. 13–15, a still further preferred embodiment of the present invention is there shown. More specifically, a rectifier 120 deposits capsules at spaced intervals on a conveyor belt 122. The conveyor belt 122, as best shown in FIG. 15, includes a plurality of cup-shaped segments 124, each of which receives one capsule 10 from the rectifier 120.

Still referring to FIGS. 13–15, a second conveyor 126 includes an endless belt 128 which overlies the exit end of the first conveyor 122. As best shown in FIG. 15, a transfer wedge 130 frictionally engages the capsules 110 on the first conveyor 122 and lifts the capsules 10 into engagement with the conveyor belt 128.

As best shown in FIG. 14, two stationary rails 132 and 134 support the ends of the capsule 10 while the conveyor belt 128 moves the capsule 10 along the stationary rails 132 and 134. Simultaneously, an elongated bar 136 having a tapered or shaped edge 138 engages the capsule 10 to form the desired indentation in the capsule 10. Preferably, the interference between the bar 136 and capsules 10 increases from the entry into the exit end of the conveyor 126 and, in addition, the bar 136 is preferably heated. Following the formation of the indentation in the capsules 10, the capsules 10 are ejected through a chute 140 and to a collection bin 142 (FIG. 13).

Figure 21:
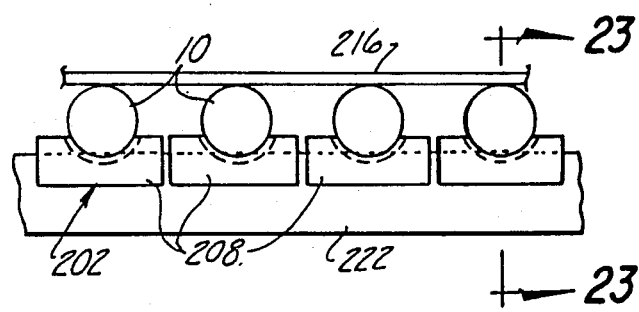
FIG. 21 is an enlarged view of circle 21 in FIG. 20.
Figure 22:
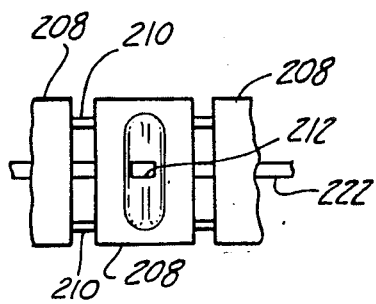
FIG. 22 is a fragmentary top view taken substantially along line 22—22 in FIG. 21 and with parts removed for clarity.

With reference now to FIGS. 20–23, a still further preferred embodiment of the present invention is there shown. More specifically, a rectifier 200 deposits capsules at spaced intervals on a conveyor belt 202 longitudinally driven at a predetermined speed around two drive wheels 204 and 206. The conveyor belt 202, as best shown in FIGS. 21 and 22 includes a plurality of capsule-shaped cavity segments 208, each of which receives a capsule 10 from the rectifier 200. The capsule-shaped cavity segments 208 are joined together by links 210 and include a longitudinally extending slot 212 (FIG. 22) along their bottom for a reason to be subsequently described.

Still referring to FIGS. 20–23, a second conveyor 214 includes an endless belt 216 which overlies a portion of the first conveyor 202. The belt 216 is rotatably driven around wheels 218 and 220 at a speed difference from the speed of the first conveyor 202 and preferably at twice the speed of the first conveyor 202.

Figure 23:
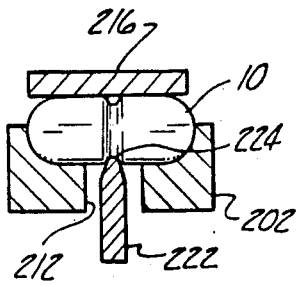
FIG. 23 is a sectional view taken along line 23—23 in FIG. 21 and enlarged for clarity.

As best shown in FIGS. 21 and 23, both conveyors 202 and 216 engage the sides the capsules 10 and, due to their differential speed, rotate the capsules 10 about their axes. Simultaneously, an elongated bar 222 having a tapered or shaped edge 224 (FIG. 23) extends through the slot 212 and engages the capsule 10 to form a desired indention in the capsule 10. Preferably, the interference between the bar 222 and capsules 10 increases from the entry and to the exit end of the conveyor 216 and, in addition, the bar 222 is preferably heated. Following the formation of the indentation in the capsules 10, the capsules 10 are ejected through a chute 230 and to a collection bin 232 (FIG. 20).

Figure 24:
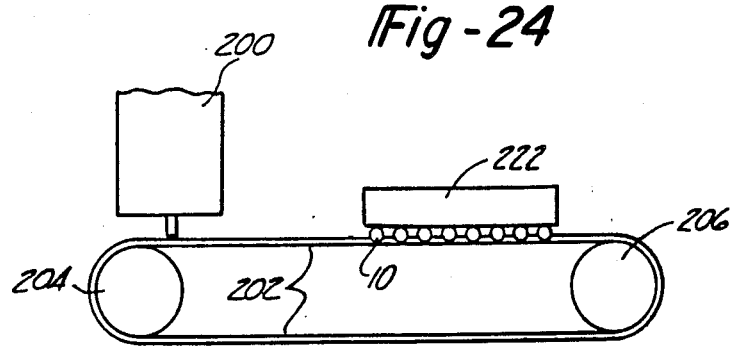
FIG. 24 is a side view showing a further preferred embodiment of the invention.

Alternatively, as shown in FIG. 24, in the absence of slot 212 and upper conveyor belt 216, the elongated bar 222 is positioned above the conveyor belt 202 and capsules 10 so that the bar is substantially parallel to the path of travel of the capsules 10. In addition, the bar 222 is positioned so that its tapered edge frictionally engages the portion of the capsules in which the cap overlies the body thereby rotating the capsules so that the indentation is formed circumferentially around the entire capsule.

From the foregoing, it can be seen that the present invention provides a device for sealing the cap and body of a conventional capsule together which fixedly secures the capsule cap and body together, i.e., prevents the subsequent separation of the capsule cap and body without destruction of the capsule itself. Consequently, the device of the present ivention renders the treated capsules 10 tamper evident.

A still further advantage of the device of the present invention is its capability in providing a fluid (hermetic) seal between the capsule cap and body. This fluid seal enables the capsules to contain liquid or paste medicines.

A still further advantage of the present invention is that the indentation weakens the capsule at the indentation and insures that the cap and body cannot be separated without destruction of the capsule.

Having described my invention, however, many modifications thereto will become apparent to those skilled in the art to which it pertains without deviation from the spirit of the invention as defined by the scope of the appended claims.

I claim:

1. A method for sealing a capsule of the type commonly used to contain medication and having an elongated cylindrical body and cylindrical cap that is assembled by slidably inserting said body into said cap so that a portion of the cap overlies a portion of the body, so that an attempt to separate an assembled, sealed capsule will result in the destruction of the capsule to thereby indicate tampering with same, said method for sealing comprising the steps of:

moving an assembled capsule cap and body and a thin, elongated bar relative to each other such that said assembled capsule starts its relative movement with its axis spaced a first distance from an edge of one end of said bar and ends its relative movement with its axis spaced a second distance from the edge of the other end of said bar, where said first distance is greater than said second distance, and said capsule rotated during said relative movement, and heating said elongated bar such that it is hottest at a first point somewhere between the ends of said bar and coolest at the ends of said bar, the temperature of the edge of said bar at a second point closest to its said one end and at which the edge of said heated bar comes into contact with said capsule being sufficient to heat plasticize the material from which said capsule cap and body are made so that they will deform to thereby form an indentation circumferentially around said assembled capsule at a point where said cap and said body overlie each other, the indentation being deep enough that an attempt to separate said cap from said body will result in them being fractured and thereby indicate tampering with the sealed capsule.

2. The method in accordance with claim 1 further comprising the step of rotating said assembled capsule as it and said elongated bar move relative to each other.

3. The method in accordance with claim 2 further comprising the step of orienting the axis of an assembled capsule cap and body substantially perpendicular to the axis of said elongated bar prior to said assembled capsule and said bar being moved relative to each other.

4. A method for sealing a capsule of the type commonly used to contain medication and having an elongated cylindrical body and cylindrical cap that is assembled by slidably inserting said body into said cap so that a portion of the cap overlies a portion of the body, such that an attempt to separate an assembled, sealed capsule will result in the destruction of the capsule to thereby indicate tampering with same, said method for sealing comprising the steps of:

moving an assembled capsule cap and body and a thin, elongated bar relative to each other such that said assembled capsule starts its relative movement in contact with an edge of one end of said bar with the capsule axis spaced a first distance from said edge and ends its relative movement with the capsule axis closer to said edge at the other end of said bar, and the friction between the edge of said bar and said capsule causes said assembled capsule to be rotatd as it and said bar move relative to each other, and heating said elongated bar such that it is hottest at a first point somewhere between the ends of said bar and coolest at the ends of said bar, the temperature of the edge of said bar at a second point closest to said one end and at which the edge of said heated bar is first in contact with said capsule being sufficient to heat plasticize the material from which said capsule cap and body are made so that they deform to thereby form an indentation circumferentially around said assembled capsule at a point where said cap and said body overlie each other, the indentation being deep enough that an attempt to separate said cap from said body will result in them being fractured and thereby indicate tampering with the sealed capsule.

5. The method in accordance with claim 4 further comprising the step of orienting the axis of an assembled capsule cap and body substantially perpendicular to the axis of said elongated bar prior to said capsule and said bar being moved relative to each other.

6. A method for hermetically sealing a capsule of the type commonly used to contain medication and having an elongated cylindrical body and cylindrical cap that is assembled by slidably inserting said body into said cap so that a portion of the cap overlies a portion of the body, so that an attempt to separate an assembled, sealed capsule will result in the destruction of the capsule to thereby indicate tampering with same, said method for hermetically sealing comprising the steps of:

moving an assembled capsule cap and body and a thin, elongated bar relative to each other such that said assembled capsule starts its relative movement with its axis spaced a first distance from an edge of one end of said bar and ends is relative movement with its axis spaced a second distance from the edge of the other end of said bar, where said first distance is greater than said second distance, and said capsule rotated during said relative movement and heating said elongated bar such that it is hottest at a first point somewhere between the ends of said bar and coolest at the ends of said bar, the temperature of the edge of said bar at a second point closest to said one end and at which the edge of said heated bar is first in contact with said capsule being sufficient to heat plasticize the material from which said capsule cap and body are made so that they will deform to thereby form an indentation circumferentially around said assembled capsule at a point where said cap and body overlie each other, and the temperature of the edge of said bar at said first point being sufficient to melt the capsule material in said indentation so that said cap and said body fuse together, the fusing and the depth of the indentation cooperating such that any attempt to separate the cap from the body will result in them being fractured and thereby indicate tampering with the sealed capsule.

7. The method in accordance with claim 6 further comprising the step of rotating said assembled capsule cap and body as it and said bar move relative to each other.

8. The method in accordance with claim 7 further comprising the step of orienting the axis of an assembled capsule cap and body substantially perpendicular to the axis of said bar prior to said capsule and said bar being moved relative to each other.

9. A method for hermetically sealing a capsule of the type commonly used to contain medication and having an elongated cylindrical body and cylindrical cap that is assembled by slidably inserting said body into said cap so that a portion of the cap overlies a portion of the body, so that an attempt to separate an assembled, sealed capsule will result in the destruction of the capsule to thereby indicate tampering with same, said method for hermeitcally sealing comprising the steps of:

moving an assembled capsule cap and body and a thin, elongated bar relative to each other such that said assembled capsule starts its relative movement in contact with an edge of one end of said bar with the capsule axis spaced a first distance from said edge and ends its relative movement with capsule axis closer to said edge at the other end of said bar, and the friction between the edge of said bar and said capsule causes said assembled capsule to be rotated as they move relative to each other, and heating said elongaged bar such that it is hottest at a first point somewhere between the ends of said bar and coolest at the ends of said bar, the temperature of the edge of said bar at a second point closest to said one end and at which the edge of said heated bar comes into contact with said capsule being sufficient to heat plasticize the material from which said capsule cap and body are made so that they will deform to thereby form an indentation circumferentially around said assembled capsule where the cap and body overlie each other, and the temperature of the edge of said bar at said first point being sufficient to melt the capsule material in said indentation so that the cap and body fuse together, the fusing and the depth of the indentation cooperating such that any attempt to separate said cap from said body will result in them being fractured and thereby indicate tampering with the sealed capsule.

10. The method in accordance with claim 9 further comprising the step of orienting the axis of an assembled capsule cap and body substantially perpendicular to the axis of said elongated bar prior to said capsule and said bar being moved relative to each other.

* * * * *